United States Patent
Seewald et al.

(10) Patent No.: US 10,180,286 B2
(45) Date of Patent: Jan. 15, 2019

(54) HEAT EXCHANGER

(71) Applicant: MAHLE International GmbH, Stuttgart (DE)

(72) Inventors: Wolfgang Seewald, Tamm (DE); Falk Viehrig, Sindelfingen (DE); Emil Neumann, Stuttgart (DE)

(73) Assignee: MAHLE International GmbH, Stuttgart (DE)

( * ) Notice: Subject to any disclaimer, the term of this patent is extended or adjusted under 35 U.S.C. 154(b) by 397 days.

(21) Appl. No.: 14/319,093

(22) Filed: Jun. 30, 2014

(65) Prior Publication Data

US 2014/0374076 A1   Dec. 25, 2014

Related U.S. Application Data

(63) Continuation of application No. PCT/EP2012/076855, filed on Dec. 21, 2012.

(30) Foreign Application Priority Data

Dec. 30, 2011 (DE) .................. 10 2011 090 159

(51) Int. Cl.
*F28D 9/00* (2006.01)
*F28D 1/03* (2006.01)
(Continued)

(52) U.S. Cl.
CPC ......... *F28D 9/0062* (2013.01); *F28D 1/0333* (2013.01); *F28D 1/0435* (2013.01);
(Continued)

(58) Field of Classification Search
CPC ......... F28D 2021/0085; F28D 1/05391; F28D 1/0341; F28D 1/0358; F28D 1/0316;
(Continued)

(56) References Cited

U.S. PATENT DOCUMENTS 3,292,690 A   12/1966   Donaldson
4,327,802 A   5/1982   Beldam
(Continued)

FOREIGN PATENT DOCUMENTS

DE      196 28 561 C1      9/1997
DE      10 2006 028017     8/2007
(Continued)

OTHER PUBLICATIONS

"American English definition and synonyms | Macmillan Dictionary", Macmillandictionary.com, 2016. [Online]. Available: http://www.macmillandictionary.com/dictionary/american/cup_1 #cup_16. [Accessed: Aug. 16, 2016].*

*Primary Examiner* — David Teitelbaum
*Assistant Examiner* — Schyler S Sanks
(74) *Attorney, Agent, or Firm* — Muncy, Geissler, Olds & Lowe, P.C.

(57) ABSTRACT

A plate-type heat exchanger, in particular for motor vehicles, is provided that includes a plurality of plate groups in order to form first and second and/or third flow paths, a spatial region for fourth flow paths being formed between adjacent plate groups, the plate groups having at least one plate pair having a first and second plate in order to form the first flow paths and the second flow paths, wherein a third plate can be arranged in interaction with one of the first or one of the second plates in order to form the third flow path.

14 Claims, 7 Drawing Sheets

(51) Int. Cl.
*F28D 1/04* (2006.01)
*F28D 20/02* (2006.01)
*F28F 3/00* (2006.01)
*F28D 21/00* (2006.01)
*F28D 20/00* (2006.01)

(52) U.S. Cl.
CPC .............. *F28D 9/00* (2013.01); *F28D 20/02* (2013.01); *F28F 3/00* (2013.01); *F28D 2020/0013* (2013.01); *F28D 2021/0085* (2013.01); *Y02E 60/145* (2013.01)

(58) Field of Classification Search
CPC ...... F28D 1/0333; F28D 9/005; F28D 9/0093; F28D 9/0062; F28D 2020/0013; F28D 2020/0021; F28D 1/0408; F28D 7/0066; F28D 20/02; F28D 2020/0008; B60H 1/3227; B60H 1/00271; F25B 39/022; F25B 39/00; F25B 39/02; F28F 9/0278; F28F 9/0246; F28F 9/0221; F28F 3/00; F28F 13/06; F28F 1/006; F28F 2009/224; B23P 15/26; F25D 17/00; Y02E 60/145
USPC ........................................ 165/148, 140, 153
See application file for complete search history.

(56) References Cited

U.S. PATENT DOCUMENTS

| | | | |
|---|---|---|---|
| 5,884,696 A | 3/1999 | Lou | |
| 5,896,916 A * | 4/1999 | Baechner | F28D 1/0341 165/153 |
| 6,257,325 B1 * | 7/2001 | Watanabe | F28D 1/0333 165/153 |
| 6,341,649 B1 * | 1/2002 | Joshi | F28D 1/0333 165/153 |
| 6,516,486 B1 * | 2/2003 | Mehendale | F28D 1/0333 165/153 |
| 7,571,759 B2 * | 8/2009 | Inagaki | F28D 1/0325 165/166 |
| 7,703,505 B2 | 4/2010 | So et al. | |
| 8,495,894 B2 | 7/2013 | Kerler et al. | |
| 2004/0093889 A1 | 5/2004 | Bureau et al. | |
| 2004/0200606 A1 * | 10/2004 | Higashiyama | F28D 1/0333 165/153 |
| 2006/0266501 A1 | 11/2006 | So et al. | |
| 2007/0029075 A1 * | 2/2007 | Mehendale | F28D 1/0333 165/153 |
| 2009/0095015 A1 * | 4/2009 | Kerler | F28D 1/05391 62/524 |
| 2009/0101319 A1 * | 4/2009 | Ashe | B01J 19/0013 165/133 |
| 2009/0255650 A1 | 10/2009 | Magill et al. | |

FOREIGN PATENT DOCUMENTS

| | | | |
|---|---|---|---|
| DE | 11 2009 000 888 | 3/2011 | |
| FR | 2 866 947 A1 | 9/2005 | |
| FR | 2 918 166 A1 | 1/2009 | |
| JP | S62 293086 A | 12/1987 | |
| WO | WO 2010/150774 A1 | 12/2010 | |
| WO | WO 2010150774 A1 * | 12/2010 | ......... B60H 1/00328 |

* cited by examiner

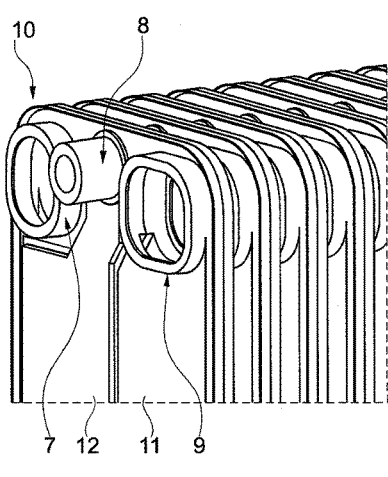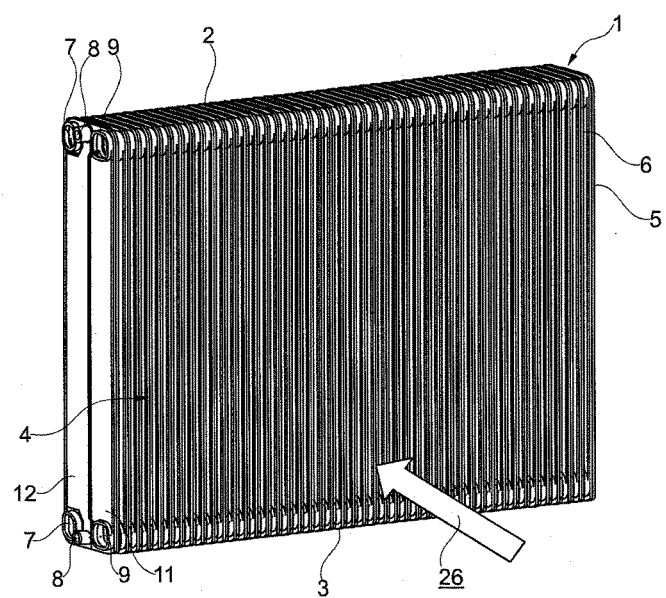
Fig. 2                               Fig. 1

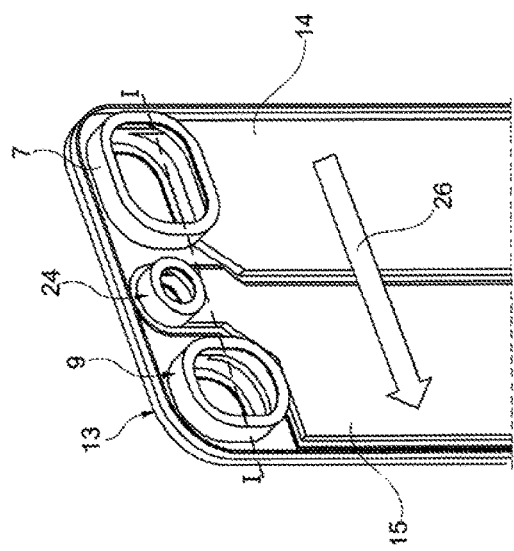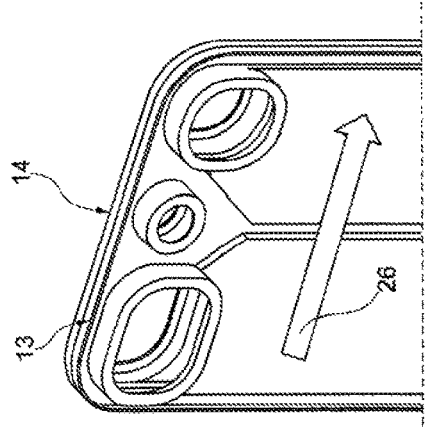

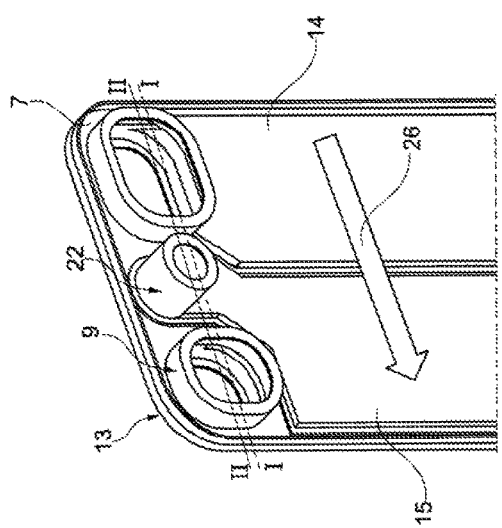
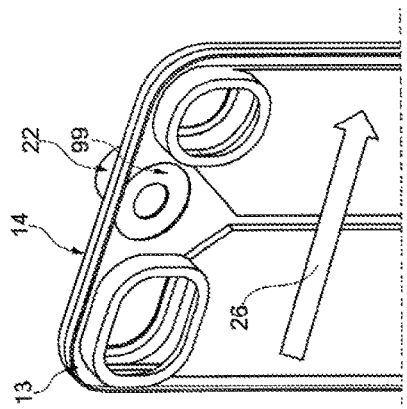

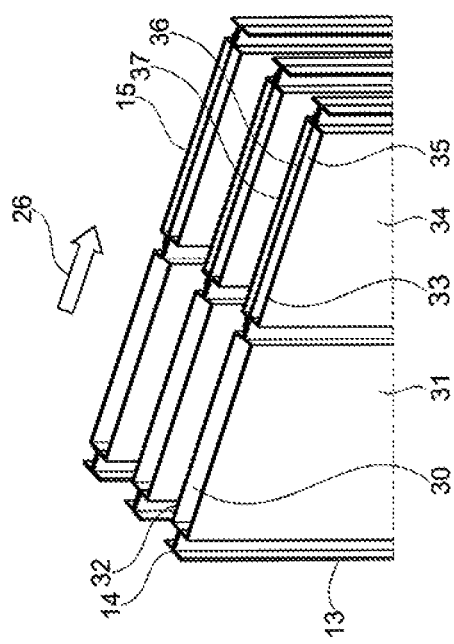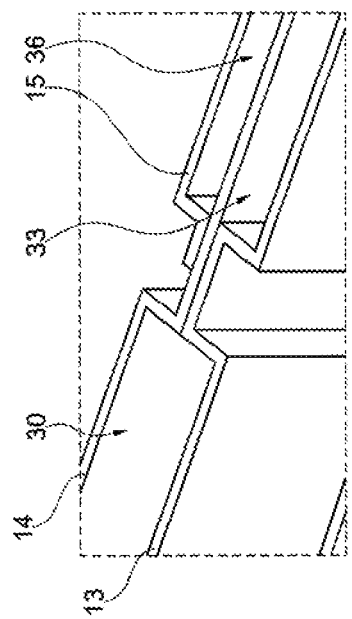

HEAT EXCHANGER

This nonprovisional application is a continuation of International Application No. PCT/EP2012/076855, which was filed on Dec. 21, 2012, and which claims priority to German Patent Application No. 10 2011 090 159.0, which was filed in Germany on Dec. 30, 2011, and which are both herein incorporated by reference.

BACKGROUND OF THE INVENTION

Field of the Invention

The invention relates to a plate-type heat exchanger, particularly for motor vehicles, with a plurality of plate groups to form first and second and/or third flow paths, whereby a spatial region for the fourth flow paths is formed between adjacent plate groups.

Description of the Background Art

Heat exchangers are provided in motor vehicles in a wide variety and for a multitude of different purposes. Thus, evaporators are used in climate control systems in order to cool the air by evaporation of the refrigerant in flow paths flowing through the evaporator, in order to bring about an air conditioning and dehumidification in the vehicle interior. Flat tube-type or plate-type evaporators have become known for this purpose.

In regard to motor vehicles, the main trend in recent times has been to reduce the fuel consumption of a motor vehicle and the $CO_2$ emissions associated therewith. This is also achieved in the case of motor vehicles with an internal combustion engine in that during temporary idling caused by stopping of the vehicle at a traffic light or in similar situations, for example, the vehicle's combustion engine is turned off. As soon as the vehicle is reactivated to drive by actuation of the gas pedal or the clutch pedal, the internal combustion engine is automatically restarted. This technology is also called the start-stop method. Such start-stop methods have already been implemented in low-consumption motor vehicles. For commercially available vehicle climate control systems with a cooling circuit according to the vapor compression cycle, the compressor of the cooling circuit is usually powered by a belt drive, driven by the vehicle's driving engine. When the engine is idle, i.e., when the compressor drive is not working, the climate control system can no longer be described as cold-producing. With a turned-off engine in the start-stop operation, the air conditioning of the motor vehicle can therefore no longer operate and provide a cooling capacity for cooling the vehicle's interior. As a consequence of this situation, the evaporator of the climate control system warms up relatively quickly and the air flowing through the evaporator is cooled only slightly or too little. For one thing this causes the interior vehicle temperature to rise and to affect the physical comfort of the vehicle passengers negatively.

Apart from the temperature reduction, a dehumidifying process also occurs in a vehicle climate control system, because the moisture in the air condenses in the evaporator and leaves the vehicle through a condensate outlet. The air flowing through the evaporator is therefore dehumidified and enters dehumidified the motor vehicle interior. In the case of the active start-stop operation, the dehumidification of the air entering the vehicle interior can thus no longer be sufficiently assured, so that the humidity in the vehicle interior increases during the active start-stop operation. This also results in an increase in humidity which is perceived as unpleasant and uncomfortable by the vehicle passengers.

In order to prevent or slow down these temperature- and humidity-increasing processes, the so-called storage evaporator was developed which, in addition to the actual evaporator function, also comprises a cold storage medium that removes heat from the air flowing through the evaporator in an active start-stop operation and continues to cool and dehumidify it.

These storage evaporators have been disclosed, for example, in DE 102006028017, which corresponds to U.S. Pat. No. 8,495,894, and which is incorporated herein by reference. The storage evaporator disclosed has two separate heat exchanger blocks, the evaporator and the storage section, which are produced in different production processes and are connected together just before the soldering process and are then soldered together to a unit. The main evaporator has two flat tube rows, arranged one behind the other in the air flow direction, and the storage section is connected downstream of these two flat tube rows in the air flow direction. The storage part has double-tube rows with two tubes being inserted into one another, whereby the refrigerant flows in the interior of the inner tube and the cold storage medium is disposed in the space between the outer tube and the inner tube.

However, in the conventional art, the corresponding production process is very complex and expensive, because many different parts have to be matched, joined, and calibrated in order to be able to produce a properly functioning heat exchanger. In particular, a double tube with covered tube entries proves to be relatively complex, the number of parts is very high with at the same time a high number of different parts and compliance with tolerances represents a risk for process capability due to the many structural parts. This in turn means an increased risk of leakage, so that apart from the parts costs the risk of the reject rates also increases.

SUMMARY OF THE INVENTION

It is therefore an object of the invention to provide a heat exchanger, which is simple to manufacture and results in lower costs than the heat exchangers known in the conventional art at a simultaneously reduced complexity and reduced rejection rate.

In an exemplary embodiment, a plate-type heat exchanger is provided, particularly for motor vehicles, with a plurality of plate groups to form first and second and/or third flow paths, whereby a spatial region for the fourth flow paths is formed between adjacent plate groups, the plate groups has at least one plate pair having a first and second plate to form the first flow paths and the second flow paths, whereby a third plate can be arranged in conjunction with one of the first or one of the second plates in order to form the third flow path. The plate-type design avoids the need for the insertion of flat tubes into one another, which simplifies the production process. The heat exchanger of the invention can provide a heat exchanger for a plurality of fluids participating in the heat transfer. Thus, a heat exchanger can be provided which can be operated as a storage evaporator, whereby in this heat exchanger refrigerant flows in the first and second flow path, a cold storage medium is provided in the third flow path, and the air to be cooled flows through the fourth flow path. As an alternative exemplary embodiment, however, a heater with a heat-storage unit can also be provided, where a heat-transporting fluid, such as, for example, a coolant of the internal combustion engine, flows in the first and second flow path, a heat storage medium is provided in the third flow path, and the air to be heated flows through the fourth flow path.

According to an embodiment of the invention, the plates of the heat exchanger can have at least in part openings and/or cups as connecting and interconnecting regions and have channel-forming structures, such as embossings, to form flow paths between connecting regions. These can preferably be produced by embossing or deep-drawing, so that both the cups are drawn from the flat plate or the flat strip and the channel-forming structures are embossed or drawn. With this process or tool the openings can also be stamped out.

The first plate of the plate group at two opposite end regions can have two connecting regions each as an inlet and/or outlet of the first and second flow path and a channel-forming structure is provided between each of the two connecting regions to form the first and second flow path, whereby, furthermore, two openings and/or cups are provided at opposite ends of the first plate for connection to the third flow path. A rectangular plate, for instance, is provided with two short and two long sides, whereby then advantageously the particular connecting regions of the first plate are arranged on the two opposite short sides. In this regard, the flow paths of the first and second structures formed as flow paths would then be directed, for instance, in the direction of the long sides. As a result, a relatively long first and second flow path for the flowing fluid, such as for the refrigerant, can be created and a shorter fourth flow path for the air. This reduces the pressure drop for air and the noise of the air in the evaporator.

The second plate of the plate group at two opposite end regions can have two connecting regions each as an inlet and/or outlet of the first and second flow path and a channel-forming structure between two connecting regions to form the first or second flow path, whereby, furthermore, two openings and/or cups are provided at opposite ends of the first plate for connection to the third flow path.

Also, no channel-forming structure or a volume-modified or reduced channel-forming structure can be formed between the two connecting regions of the second or first flow path. This is advantageous, so that the third flow path can be disposed in this region, without there being highly interfering effects of the first or second flow path.

A third plate can be connected to the second plate such that it is arranged in the plate region without a channel-forming structure or with a modified or reduced channel-forming structure and forms the third flow path and has openings and/or cups, which communicate with the openings and cups of the third flow path of the second plate as an inlet or outlet. This is advantageous because the third flow path can then be disposed in this region, without there being interfering effects of the first or second flow path.

The connecting and interconnecting regions of the three flow paths can be arranged such that a connecting and interconnecting region of each flow path is arranged substantially next to one another at an opposite end of the plate or plate group.

A connecting and interconnecting region of the third flow path can be arranged between the connecting and interconnecting regions of the first and second flow path. This permits a uniform arrangement of connections, because the connection of the third flow channel can thus be kept smaller than the connection of the two other flow channels.

A connecting and interconnecting region of the third flow path can be arranged next to connecting and interconnecting regions of the first and second flow path.

The cup-shaped connecting and interconnecting regions and/or the channel-forming structures of the first and/or second and/or third plate can be made equally deep relative to the first and/or second and/or third flow channel in the direction perpendicular to the plane of the plate. This permits the flow channels in their depth to be adapted to requirements, so that, for example, the first and second flow channels can be designed with a similar flow cross section.

The cup-shaped connecting and interconnecting regions and/or the channel-forming structures of the first and/or second and/or third plate in regard to the first and/or second and/or third flow channel can be formed in a direction perpendicular to the plane of the plate such that the depth of the channel-forming structures of the first plate is greater or smaller than the depth of the channel-forming structures of the second and/or third plate in regard to the second and third flow path. This permits the flow channels in their depth to be adapted to requirements, so that, for example, the first and second flow channels can be designed with a greater flow cross section than the third flow channels.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 illustrates a first exemplary embodiment of a heat exchanger of the invention;

FIG. 2 illustrates a view of a detail enlargement according to FIG. 1;

FIG. 7 illustrates a view of a plate arrangement of a heat exchanger;

FIG. 8 illustrates a view of a plate arrangement of a heat exchanger;

FIG. 9 illustrates a view of a plate arrangement of a heat exchanger;

FIG. 10 illustrates a view of a plate arrangement of a heat exchanger;

FIG. 15 illustrates a view of a plate arrangement of a heat exchanger in a sectional illustration; and FIG. 16 illustrates a view of a plate arrangement of a heat exchanger in a sectional illustration.

DETAILED DESCRIPTION

Figure 3:
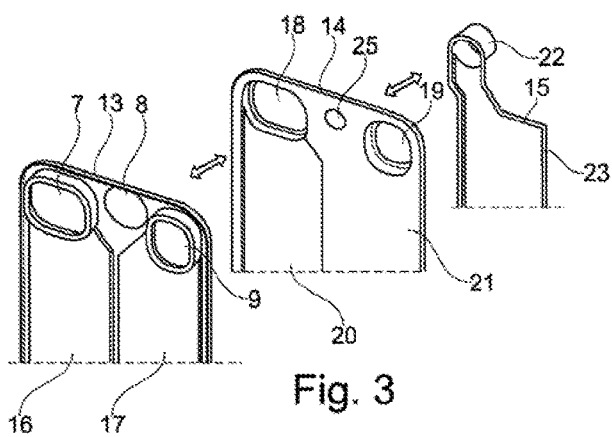
FIG. 3 illustrates a view of a plate arrangement of a heat exchanger.

FIG. 1 shows a heat exchanger 1 with a first top header 2 and a second bottom header 3, which are arranged at two opposite ends of the heat exchanger and extend in a transverse direction, and having a block 4, in which the block network includes plates that are joined together to form plate groups, a plurality of plate groups 5 being arranged next to one another in order to form the heat exchanger network. Spatial regions 6, which are used for the flow of air through the heat exchanger, for example, are provided between two adjacent plate groups 5. The air flow direction is indicated by arrow 26. Fins such as, for example, corrugated fins can also be provided in the indicated spatial regions to improve the heat transfer.

It is evident that the top and bottom headers have substantially three flow channels, which are indicated by the three connecting pieces 7, 8, 9. These flow channels of the header extend in the transverse direction at the top side and at the bottom side of the heat exchanger. Flow channels, which divide into first, second, and third flow channels 10, 11, 12, are provided between the headers. Flow channels 12 are formed between opposite connecting regions 8, flow channels 11 are formed between opposite connecting regions 9, and flow channels 10 are formed between opposite connecting regions 7.

As is evident in FIG. 3, a plate group has a first plate 13, a second plate 14, and a third plate 15. First plate 13, also evident in FIG. 4, has three connecting and interconnecting regions 7, 8, 9 at its top narrow side, whereby these connecting and interconnecting regions are also arranged at the bottom opposite narrow side of plate 13. In this case, connecting and interconnecting regions 7 and 9 are formed as cups projecting out of the plane of the plate in a direction oriented perpendicular thereto. Connecting and interconnecting regions 8 can advantageously also be formed as cups, but also as openings without cups, as is evident in FIG. 3 or in FIG. 4.

Channel-forming structures 16, 17, which connect the cup-shaped connecting and interconnecting regions to a flow channel, are provided between connecting and interconnecting regions 7 or 9 at the top and bottom end region of a plate. Here, channel-forming structure 16 forms a first flow channel and channel-forming structure 17 a second flow channel. As is evident, second plate 14 also has two cups 18, 19 at the top and bottom end region of the short sides, whereby furthermore an opening 25 is provided for the flow of a third medium through a third flow channel. Connecting and interconnecting regions 18 of second plate 14 are in turn connected together by means of a channel-forming structure 20. Channel-forming structure 20 works together with channel-forming structure 16 in the case of connected first and second plates 13, 14, in order to form a first flow channel. With the two plates 13 and 14 connected to one another, a first flow channel arises formed by channel-forming structures 16 and 20, and a second flow channel is formed by channel-forming structure 17. It follows that in connecting the two plates 13, 14, the first flow channel has a greater depth perpendicular to the plate plane than the second flow channel. The first flow channel is therefore formed by the channel-forming structures, such as embossings 16 and 20, with the second flow channel being formed solely by channel-forming structure 17, because no channel-forming structure is provided in the second plate between cups 19. The channel-forming structures are preferably embossings in the plate, resulting in indentations and thereby channels.

It can also be seen that a further plate 15 is placed on second plate 14 and is connected sealingly to it. Plate 15 with plate 14 in its flat region thereby forms flow channel 12, because flow channel 12 is formed between the top connection and bottom connection 22 with plate 15 being arranged on the planar region 21 provided on second plate 14. Connecting region 22 of plate 15, formed as a cup or passage, for example, is arranged such that it aligns with opening 25 and opening 8 of the first or second plate in the horizontal direction, for instance.

As can be seen, first plate 13 and second plate 14 have a projecting circumferential edge, by means of which the two plates can be soldered sealingly to one another. Plate 15 also has a circumferential edge 23, by means of which plate 15 can be soldered onto planar region 21 of plate 14.

FIG. 3 shows how first plate 13, second plate 14, and third plate 15 can be arranged relative to one another and also can be connected to one another.

Figure 4:
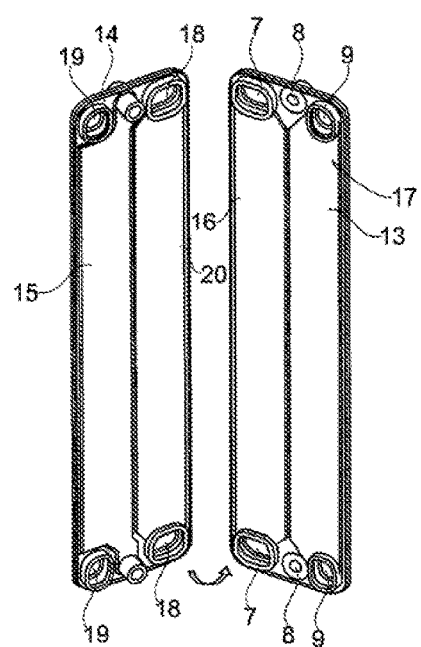
FIG. 4 illustrates a view of a plate arrangement of a heat exchanger.

FIG. 4 shows a plate group having a first, second, and third plate 13, 14, 15 connected to one another, whereby the left half of the figure shows the plate group from the side of second and third plate 14, 15, whereas in the right half of the figure the plate group can be viewed from first plate 13 outward.

Figure 5:
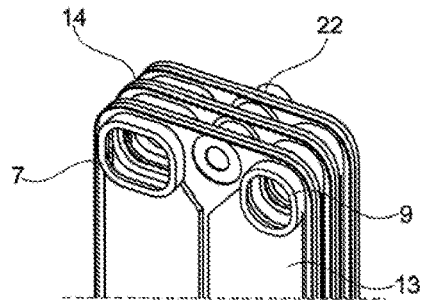
FIG. 5 illustrates a view of a plate arrangement of a heat exchanger.

FIG. 5 shows the sequential arrangement of three plate groups having first, second, and third plates 13, 14, 15, with the front view corresponding to first plate 13, and plate 14 being arranged connected thereto, and of plate 15 only cup 22 can be seen as a passage.

FIG. 5 shows the arrangement of the connection of the cups of plates 13 and 14, which soldered one onto the other project from plate pair 13, 14, whereby adjacent plate pairs 13, 14 are soldered fluid-tight adjoining one another with these cups. Connecting cups 22 are arranged between cups 7 and 9, whereby these are formed deeper in the axial direction than cups 7, 9 of the first plate and cups 18, 19 of the second plate, while the first plate has no cup in the area of passage 8. Therefore, cup 22 of the third plate must substantially have the sum of the depths of cups 7 and 18 or 9 and 19.

Figure 6:
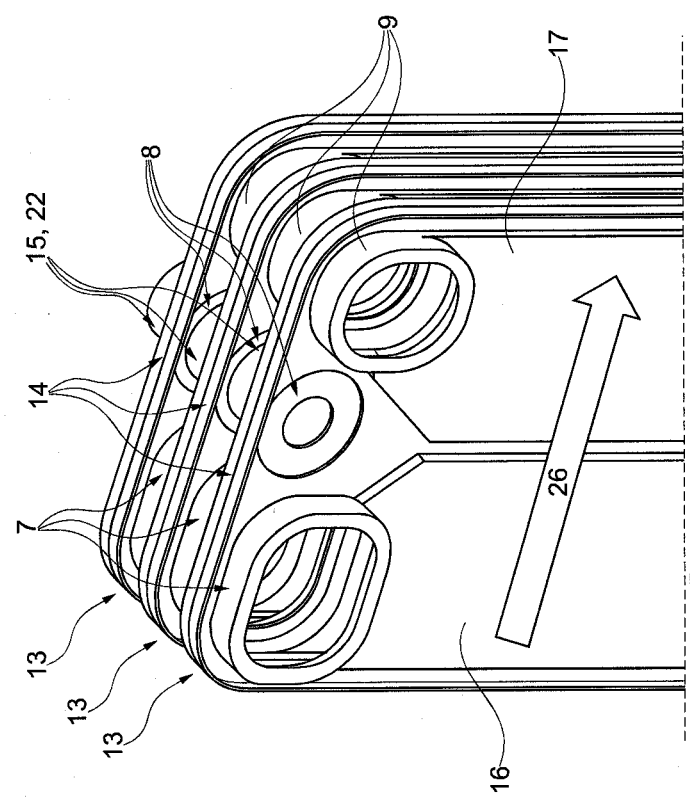
FIG. 6 illustrates a view of a plate arrangement of a heat exchanger.

FIG. 6 shows the arrangement of three plate groups having first plates 13, second plates 14, and third plates 15, whereby of third plates 15 only passages 22 can be seen in each case.

The two first and second plates 13, 14 lie against one another with their circumferential edges. Passages 7, 9 of the first plate are embossed forwards, whereby passages 22 of the third plate are embossed toward the back. The backward protruding passages or cups of second plate 14, which cannot be seen in this perspective view, however, lie between these. It is clear, however, that the passages or cups 22 are at twice the height as the refrigerant cups. FIG. 4 shows that the backward protruding cups 22 of third plate 15 are approximately at twice the height as the cups of first and second plate 13, 14.

It is also evident that the channel-forming structures of first plate 13, 16 proceeding from cups 7, 9 expand to approximately half the width of the first plate and in the area of opening 8 of the first plate have a gusset-like recess, so that in this area soldering of first plate 13 to the cup of third plate 15 may be provided.

FIGS. 7 to 10 show the design of the first, second, or third plates 13, 14, 15 in two different variants, whereby in FIGS. 7 and 8 the cups of first, second, and third plate 13, 14, 15 have the same depth or length, and in the exemplary embodiment of FIGS. 9 and 10 cup 22 of third plate 15 has twice the depth of cups 7, 9 of first and second plate 13, 14, whereby the first plate in the connection area of the third plate has no cup. Here, cups 7, 9 have the same depth as cup 24 of third plate 15. It can be seen in FIG. 9 that cup 7 and cup 9 have approximately only half the depth of cup 22 of third plate 15.

Figures 11, 12:
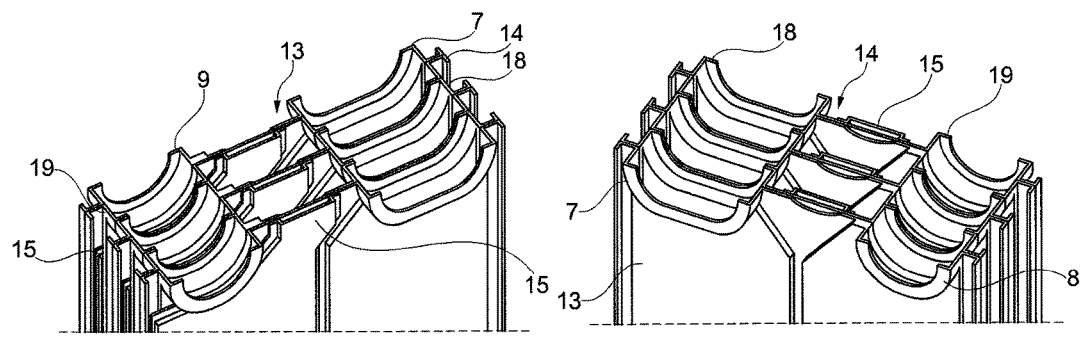
FIG. 11 illustrates a view of a plate arrangement of a heat exchanger in a sectional illustration.
FIG. 12 illustrates a view of a plate arrangement of a heat exchanger in a sectional illustration.

FIGS. 11 to 14 show cuts through the plate groups, whereby FIGS. 11 and 12 show a cut through a plate group, which occurs in FIG. 7 or 9 approximately in the middle of cups 7, 9 along line I-I, whereby this cut is made below cup 22 or 24.

FIG. 11 shows the arrangement of three plate groups having a first plate 13, a second plate 14, and a third plate 15 in a side view from which the second plate and the third plate can be recognized. Three such plate groups are shown with connection of the cups of the plates to one another. It can be seen that cups 7, 9 of the first plate have substantially the same depth as cups 18, 19 of the second plate. The cup of the third plate cannot be seen. Here, only an area of channel-forming structure of the third plate 15 is visible.

Figures 13, 14:
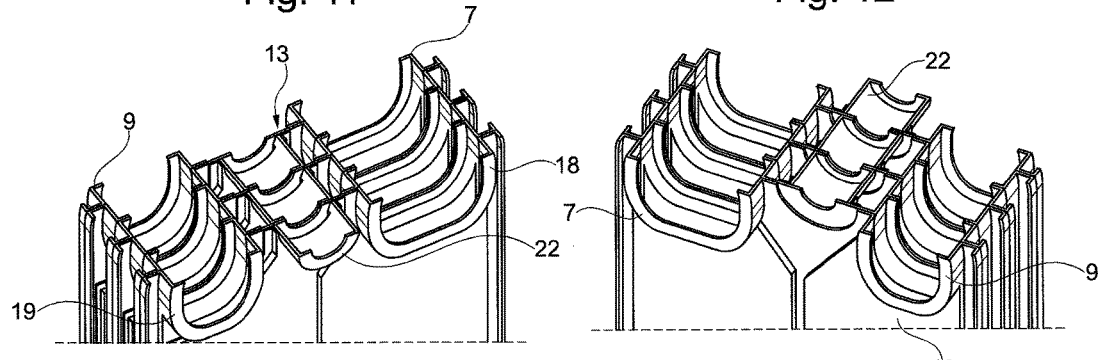
FIG. 13 illustrates a view of a plate arrangement of a heat exchanger in a sectional illustration.
FIG. 14 a view of a plate arrangement of a heat exchanger in a sectional illustration.

FIG. 12 shows the same configuration of plates 13, 14, 15 as FIG. 11, but only from the other side, so that in FIG. 12 the view is of first plate 13 as it were. FIGS. 13 and 14 show a cut through a plate arrangement according to FIG. 9 but at the height of the middle of passage 22 according to line II-II.

This cut occurs somewhat further above in comparison with the cut indicated by line I-I, so that now the three plate groups are cut and shown in the middle of cup 22. It can be clearly seen that cup 22 has twice the depth in comparison with cups 19 or 9 or 7 and 18. Therefore no cup is arranged on the side opposite to cup 22 of plate 13, so that the far end of cup 22 on the opposite side touches first plate 13 directly without interconnection of a corresponding cup.

The absence of the cup on the sides of first plate 13 can be clearly seen in FIG. 14.

FIGS. 15 and 16 show a cut through the arrangement of the plate groups according to FIG. 6, whereby the plate groups are cut in the center of the plates. FIG. 6 shows a section of FIG. 5 with respect to an area in the middle of a plate group.

FIG. 15 shows the plate group from the side of first plate 13, provided on the back with plate 14, and onto the right side of which a plate 15 is again applied. First flow path 30 is formed between channel-like structure 31 of plate 13 and the channel-like structure 32 of plate 14. Second flow path 33 is formed by channel-like structure 34 of plate 13 and planar plate surface 35 of the second plate. The second plate is preferably planar in this region but can also assume a specific structure.

Third flow path 36 is formed by wall 35 of the second plate and channel-like structure 37 of third plate 15.

As can be seen in FIG. 16, first flow path 30 is arranged between the first and second plate. Adjacent thereto, second flow path 33 is also arranged between the first and second plate, whereby third flow path 36 is arranged between the second plate and third plate. The expansion of the first flow path corresponds substantially to the expansion of the second flow path plus the expansion of the third flow path plus the thickness of the wall of the second plate.

In the present exemplary embodiment of FIGS. 9 and 10 with extended passage 22 of plate 15, it can be seen that section 99 in plate 13 is greater than the diameter of passage 22, so that upon soldering of two plate groups 13, 14, 15 one on top of the other, passage 22 does not come into contact with plate 13 but with plate 14, onto which plate 15 is soldered from the other side. As a result, in the case of leakage between the soldered plates in the area of passage 22, it occurs only between the channel between plates 14 and 15 and the outer area, without the other channels being involved and adversely affected.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A plate-type heat exchanger for motor vehicles, the heat exchanger comprising:

a plurality of plate groups to form first, second and third flow paths, wherein a spatial region for a fourth flow path is formed between adjacent plate groups, each plate group having at least one plate pair having a first and second plate to form the first flow path and the second flow path; and a third plate arranged in conjunction with one of the first or one of the second plates in order to form the third flow path, wherein the third plate has, at each of two opposite end regions thereof along a longitudinal direction, a single cup projecting therefrom, such that the third plate only includes a total of two cups, the two cups being a first cup provided at a first one of the two opposite end regions of the third plate and a second cup provided at a second one of the two opposite end regions of the third plate, the first cup and the second cup of the third plate each connecting solely to the third flow path, wherein the first plate has three connecting regions at each of two opposite end regions along the longitudinal direction, such that in each of the two opposite end regions, a first one of the three connecting regions acts as an inlet or outlet of the first flow path, a second one of the three connecting regions acts as an inlet or outlet of the second flow path and a third one of the three connecting regions connects to the third flow path, wherein the first plate further includes two channel-forming structures between each of the two opposite end regions to form the first and second flow path, wherein the second plate has three connecting regions at each of two opposite end regions along the longitudinal direction, such that in each of the two opposite end regions, a first one of the three connecting regions acts as an inlet or outlet of the first flow path, a second one of the three connecting regions acts as an inlet or outlet of the second flow path and a third one of the three connecting regions connects to the third flow path, wherein the second plate further includes a channel-forming structure between the two opposite end regions to form the first flow path, wherein the third plate is narrower than each of the first plate and the second plate, and wherein the second plate is sandwiched between the first plate and the third plate.

2. The heat exchanger according to claim 1, wherein a volume of the second flow path is smaller than a volume of the first flow path.

3. The heat exchanger according to claim 1, wherein the third plate is connected to the second plate such that the third plate is arranged in a plate region of the second plate without a channel-forming structure or with a modified or reduced channel-forming structure and forms the third flow path, wherein the first cup of the third plate communicates with the third one of the three connecting regions at a first end region of the two opposite end regions of the second plate and wherein the second cup of the third plate communicates with the third one of the three connecting regions at a second end region of the two opposite end regions of the second plate.

4. The heat exchanger according to claim 1, wherein in each of the two opposite end regions of each of the first plate and the second plate, the first one, the second one and the third one of the three connecting regions are arranged next to one another.

5. The heat exchanger according to claim 1, wherein in each of the two opposite end regions of each of the first plate and the second plate, the third one of the three connecting regions is arranged between the first one and the second one of the three connecting regions.

6. The heat exchanger according to claim 1, wherein in each of the two opposite end regions of each of the first plate and the second plate, the third one of the three connecting regions is arranged next to the first one and the second one of the three connecting regions.

7. The heat exchanger according to claim 1, wherein the first one and the second one of the three connecting regions at each of the two opposite end regions of the first and second plate are formed as cups, and the channel-forming structures of the first and second plate and a channel-forming structure of the third plate are made equally deep in a direction perpendicular to a plane of the first, second or third plate.

8. The heat exchanger according to claim 1, wherein the first one and the second one of the three connecting regions at each of the two opposite end regions of the first and second plate are formed as cups, and the channel-forming structures of the first and second plate and a channel-forming structure of the third plate are formed in a direction perpendicular to a plane of the first, second or third plate, and wherein a depth of the channel-forming structures of the first plate is greater or smaller than a depth of the channel-forming structures of the second and third plate.

9. The heat exchanger according to claim 1, wherein the first one and the second one of the three connecting regions at each of the two opposite end regions of the first plate are each formed as a respective cup, and wherein the third one of the three connecting regions provided at each of the two opposite end regions of the first plate for connection to the third flow path is an opening, such that the first plate only includes a total of four cups.

10. The heat exchanger according to claim 9, wherein the four cups of the first plate project in a direction that is opposite to a projecting direction of the two cups of the third plate.

11. The heat exchanger according to claim 1, wherein the first one and the second one of the three connecting regions at each of the two opposite end regions of the second plate are each formed as a respective cup, and wherein the third one of the three connecting regions provided at each of the two opposite end regions of the second plate for connection to the third flow path is an opening, such that the second plate only includes a total of four cups.

12. The heat exchanger according to claim 11, wherein the four cups of the second plate project in a same direction as a projecting direction of the two cups of the third plate.

13. The heat exchanger according to claim 9, wherein the two cups of the third plate each have a greater depth than a depth of each of the four cups of the first plate.

14. The heat exchanger according to claim 1,
wherein the first one, the second one and the third one of the three connecting regions at each of the two opposite end regions of the first plate are each formed of a separate, respective opening, such that three openings are provided at a first one of the two opposite end regions of the first plate and three openings are provided at a second one of the two opposite end regions of the first plate, and
wherein the first one, the second one and the third one of the three connecting regions at each of the two opposite end regions of the second plate are each formed of a separate, respective opening, such that three openings are provided at a first one of the two opposite end regions of the second plate and three openings are provided at a second one of the two opposite end regions of the second plate.

* * * * *